United States Patent
Kume et al.

(10) Patent No.: US 7,093,039 B2
(45) Date of Patent: Aug. 15, 2006

(54) COMMUNICATION TERMINAL INCREASING EFFECTIVE DATA RATE ON ASYNCHRONOUS TRANSMISSION AND A DATA TRANSMISSION METHOD THEREFOR

(75) Inventors: Hiroshi Kume, Tokyo (JP); Yuji Honda, Tokyo (JP); Yasuhiro Miyazaki, Tokyo (JP); Yoshikatsu Matsuo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 304 days.

(21) Appl. No.: 10/015,695

(22) Filed: Dec. 17, 2001

(65) Prior Publication Data
US 2003/0041199 A1 Feb. 27, 2003

(30) Foreign Application Priority Data
Jul. 9, 2001 (JP) .............................. 2001-207515

(51) Int. Cl.
G06F 13/38 (2006.01)
(52) U.S. Cl. ........................................ 710/71; 710/260
(58) Field of Classification Search ................ 710/70, 710/71; 709/260, 262
See application file for complete search history.

(56) References Cited
U.S. PATENT DOCUMENTS 5,210,749 A * 5/1993 Firoozmand ................ 370/463
5,539,527 A 7/1996 Kajimoto et al.
5,619,544 A * 4/1997 Lewis et al. ................ 375/377
6,378,011 B1 * 4/2002 Moore et al. ................. 710/71
6,717,516 B1 * 4/2004 Bridgelall ................ 340/572.1

FOREIGN PATENT DOCUMENTS

JP 267246/1994 9/1994
JP 44635/1996 12/1995

* cited by examiner

Primary Examiner—Paul R. Myers
Assistant Examiner—Clifford Knoll
(74) Attorney, Agent, or Firm—VolentineFrancos& Whitt,PLLC (57) ABSTRACT

A UART sets a predetermined threshold remaining data amount n, which defines an interrupt position, in a transmission trigger detector before data transmission is completed, checks if a trigger, which indicates the value of a read pointer RP or a count value N has reached a position indicated by the setting, has occurred and, if the trigger has occurred, causes a trigger detector to output a interrupt output control signal to an internal interrupt circuit to perform internal interrupt processing. Upon detecting this trigger, the internal interrupt circuit outputs an internal interrupt signal. When all data has not yet been transmitted from a transmission FIFO circuit, a CPU of a host controls the amount of data to be transferred to the transmission FIFO circuit, considering the threshold n, to prevent data in that circuit from being overwritten.

2 Claims, 7 Drawing Sheets

COMMUNICATION TERMINAL INCREASING EFFECTIVE DATA RATE ON ASYNCHRONOUS TRANSMISSION AND A DATA TRANSMISSION METHOD THEREFOR

BACKGROUND OF THE INVENTION

1. Field of the Invention

The present invention relates to a communication terminal and a data transmission method therefor. The present invention is applicable to, for example, a Universal Asynchronous Receiver-Transmitter (hereinafter called UART) in a controlling main unit, a method conveniently used by the UART for interrupting the main controlling unit, and asynchronous transmission between the main unit and a slave device with the UART.

2. Description of the Background Art

The UART, like other peripheral devices of a processor, has been evolving as means for efficient asynchronous serial transmission with the purpose of higher speed operation, higher integration and, at the same time, price reduction. Initially, the UART was used as a standalone LSI (Large-Scale Integrator) chip under the product code 8250 introduced by National Semiconductor Corp. U.S., as a low-speed communication device for use on an IBM's AT (Advanced Technologies) compatible personal computers. The chip was installed on an extension board or a mother board. After that, the UART has increased in performance and evolved while maintaining comparability with the software.

In general, the UART is designed on the assumption that the processor is able to transmit data at a speed higher than that of the UART. Giving processor's services to the UART would interrupt the current processing and puts a heavy software load on the processor. The processor, which performs multitasking, must control interrupt processing to give services to the UART. This interrupt puts a load on the processor and delays processing.

Now, with these points in mind and to increase the transmission rate, the NS16550 (registered trademark of National Semiconductor Corp., U.S.) with a 16-byte FIFO (First-In First-Out) buffer is generally used. The FIFO buffer is provided on both sending and receiving sides.

On the other hand, Bluetooth (registered trademark of Ericsson, Sweden) was proposed as handy, versatile radio communication means. This communication standard, initially proposed in 1994 for low-cost, low-power communication between mobile telephones, is now used as the radio card standard for personal computers. A device with the Bluetooth function conforming to this communication standard connects the Bluetooth host controller of the device to the hardware modules over a transport bus and, through this bus, performs internal communication within the device with the Bluetooth interface. This communication is controlled at the HCI (Host Controller Interface) layer, one of Bluetooth protocol stacks. HCI is a data communication interface standard used for Bluetooth. The hardware module sends or receives data, with the antenna, to or from a device in another system to perform radio data transmission.

The host controller has an HCI driver and an HCI transport driver installed. These drivers control the transport bus. More specifically, the HCI transport driver controls the hardware while the HCI driver controls the software. The hardware module has, for example, the HCI transport firmware installed internally. Between the HCI driver and the HCI transport firmware is provided the HCTL layer (Host Controller Transport Layer) that includes the HCI transport driver. The HCI transport driver controls operation to allow not only the UART but also RS (Recommended Standard)-232C, USB (Universal Serial Bus), PCMCIA (Personal Computer Memory Card International Association) PCI (Peripheral Component Interconnect), and so forth to be used.

The Bluetooth Radio, the radio communication specifications defined by the Bluetooth communication standard, uses 2.4 GHz ISM (Industrial Scientific Medicine) band to perform communication of spread spectrum system. The maximum effective data transmission rate of this communication is 723 kbps during asymmetrical transmission. Because the maximum asynchronous data transmission rate is about 1.4 μsec/bit, it takes 14 microseconds to transmit 10 bits of data.

When communicating data, for example, through the UART in the Bluetooth configuration described above, the processor interrupted causes the delay of about 20 microseconds. Therefore, data communication is restored after interrupted and following processing, is performed after this delay.

As described above, the UART uses the NS16550 (registered trademark) LSI with a 16-byte FIFO buffer for high-speed communication in order to prevent data from being lost. Because 8-bit (one-byte) data is preceded by the one-bit start bit and followed by the one-bit stop bit, 10 bits are sent per 8-bit data. Calculating the FIFO buffering time of one-byte data considering these bits gives about 220 microseconds of buffering time.

During communication performed by a device with the Bluetooth function through the UART that involves the interrupt, about 10% of the buffering time is used for the interrupt. The higher the asynchronous transmission rate, the shorter the buffering time and the longer the delay time caused by interrupt. This delay time will become so long that it cannot be neglected and, in the future, the delay time will be a problem in data communication.

The speed of radio communication between Bluetooth devices during Bluetooth asynchronous transmission is 723 kbps. UART asynchronous transmission is defined by the standard for cable transmission between a host personal computer and a Bluetooth host controller. For example, for above-described 10-bit serial communication using the UART that supports data communication at 921.6 kbps, the maximum effective transmission rate is lower than 723 kbps. Therefore, for radio communication at the maximum communication speed on a device with the Bluetooth function, higher-speed UART asynchronous transmission is required.

SUMMARY OF THE INVENTION

It is an object of the present invention to solve the drawbacks of the conventional art described above and to provide a communication terminal and a data transmission method therefor accomplishing the asynchronous cable transmission effective rate higher than the radio transmission effective rate.

To solve the above problems, the present invention provides a communication terminal that interrupts a control circuit of a host and, at a time of the interrupt, transmits data to an external unit under control of the control circuit. The communication terminal comprises a transmission buffer circuit which temporarily stores the data for continuously transferring the data during data transmission; an interrupt circuit which outputs an interrupt signal to inform the host of interrupt based on a transmission/reception condition of the data to or from the terminal and on a status of transmission error of the data; a buffer monitoring circuit which monitors a data amount in the transmission buffer circuit, sets a rest of the data amount in the transmission buffer circuit as a predetermined threshold, checks if the data amount has reached the predetermined threshold and, based on a checking result, controls an output of an interrupt signal to be output by said interrupt circuit; and a buffer control circuit which provides the buffer monitoring circuit with information used for monitoring of the data amount and controls an operation of said transmission buffer circuit, the buffer control circuit controlling transmission of a data amount, represented by a difference between a total data amount that may be stored in the transmission buffer circuit and the predetermined threshold, as a data amount to be transferred to the transmission buffer circuit.

In accordance with the present invention, the communication terminal causes the buffer monitoring circuit to receive information, which is used to monitor the amount of data to be transmitted, from the buffer control circuit, checks if the amount of data in the transmission buffer circuit has reached a threshold that has been set, and controls the output of the interrupt signal to the interrupt circuit based on the check result to allow an interrupt to be sent to the host before the transmission buffer circuit is exhausted. Therefore, data may be continuously read and written even during the period of time from the moment the interrupt occurs to the moment data is written in the transmission buffer circuit. In response to this interrupt, the control circuit sends the transmission of data amount corresponding to the difference between the total data amount of the transmission buffer circuit and the predetermined threshold to the transmission buffer circuit to avoid a data overflow in the transmission buffer circuit when data is transferred.

To solve the above problems, the present invention also provides a data transmission method, wherein a transmission buffer circuit is provided to prevent data from being lost during transmission, an interrupt is sent to a host, and data supplied in response to the interrupt under control of the host is converted to a serial form through the transmission buffer circuit for transmission to an external unit. The method comprises a first step of setting a predetermined amount of data to be left in the transmission buffer circuit as a threshold used to determine a timing position at which the interrupt will occur; a second step of transferring data from the host to the transmission buffer circuit, considering a total data storage amount of the transmission buffer circuit and the threshold; a third step of reading out data, stored in the transmission buffer circuit, for conversion to serial data; a fourth step of checking if a data amount left in the transmission buffer circuit has reached the threshold; a fifth step of incrementing a count value that corresponds to an amount of data output from the transmission buffer circuit if an amount of the transferred data that is left in the transmission buffer circuit is larger than the threshold; a sixth step of generating a control signal upon detecting that, if the amount of data left in the transmission buffer circuit has reached the threshold, the amount of data is in a timing position at which the interrupt corresponding to the status is to be generated; a seventh step of generating an interrupt signal in response to generation of the control signal; an eighth step of checking if further data transfer is to be executed in response to the interrupt signal supplied to the host; and a ninth step either for returning to the second step if the data transfer is to be continued or for terminating communication to terminate the data transfer.

In accordance with the present invention, the data transmission method sets a threshold as the amount used to determine a timing position at which the interrupt will occur; transfers data from the host to the transmission buffer circuit considering the total data storage amount of the transmission buffer circuit and the threshold; reads out data, stored in the transmission buffer circuit, for conversion to serial data; checks if the data amount left in the transmission buffer circuit has reached the threshold; increments the count value that corresponds to the amount of data output from the transmission buffer circuit if the amount of the transferred data that is left in the transmission buffer circuit is larger than the threshold; generates a control signal upon detecting that, if the amount of data left in the transmission buffer circuit has reached the threshold, the amount of data is in a timing position at which the interrupt corresponding to the status is to be generated; generates an interrupt signal in response to the generation of the control signal; checks if further data transfer is to be executed in response to the interrupt signal supplied to the host; and either returns to the data transfer processing if the data transfer is to be continued or terminates communication to terminate the data transfer. Therefore, data may be continuously read out and written even during the period of time from the moment the interrupt occurs to the moment data is written in the transmission buffer circuit to avoid a data overflow in the transmission buffer circuit when data is transferred.

To solve the above problems, the present invention also provides a storage medium storing therein a program which transmits data, wherein a transmission buffer circuit is provided to prevent data from being lost during transmission, an interrupt is sent to a host, and data supplied in response to the interrupt under control of the host is converted to a serial form through the transmission buffer circuit for transmission to an external unit. The program causes a commuter to set a predetermined amount of data to be left in the transmission buffer circuit as a threshold used to determine a timing position at which the interrupt will occur; transfer data from the host to the transmission buffer circuit, considering a total data storage amount of the transmission buffer circuit and the threshold; read data, stored in the transmission buffer circuit, for conversion to serial data; check if a data amount left in the transmission buffer circuit has reached the threshold; increment a count value that corresponds to an amount of data output from the transmission buffer circuit if an amount of the transferred data that is left in the transmission buffer circuit is larger than the threshold; generate a control signal upon detecting that, if the amount of data left in the transmission buffer circuit has reached the threshold, the amount of data is in a timing position at which the interrupt corresponding to the status is to be generated; generate an interrupt signal in response to generation of the control signal; check if further data transfer is to be executed in response to the interrupt signal supplied to the host; and either return to transferring data from the host to the transmission buffer circuit if the data transfer is to be continued or to terminating communication to terminate the data transfer.

In accordance with the present invention, the storage medium stores therein a program that sets a threshold as the amount used to determine a timing position at which the interrupt will occur; transfers data from the host to the transmission buffer circuit considering the total data storage amount of the transmission buffer circuit and the threshold; reads out data, stored in the transmission buffer circuit, for conversion to serial data; checks if the data amount left in the transmission buffer circuit has reached the threshold;

increments the count value that corresponds to the amount of data output from the transmission buffer circuit if the amount of the transferred data that is left in the transmission buffer circuit is larger than the threshold; generates a control signal upon detecting that, if the amount of data left in the transmission buffer circuit has reached the threshold, the amount of data is in a timing position at which the interrupt corresponding to the status is to be generated; generates an interrupt signal in response to generation of the control signal; checks if further data transfer is to be executed in response to the interrupt signal supplied to the host; and either returns to the data transfer processing if the data transfer is to be continued or terminates communication to terminate the data transfer. Therefore, data may be continuously read and written even during the period of time from the moment the interrupt occurs to the moment data is written in the transmission buffer circuit to avoid a data overflow in the transmission buffer circuit when data is transferred.

BRIEF DESCRIPTION OF THE DRAWINGS

The objects and features of the present invention will become more apparent from consideration of the following detailed description taken in conjunction with the accompanying drawings in which:

FIG. 1 shows how to combine FIGS. 1A and 1B;

DESCRIPTION OF THE PREFERRED EMBODIMENT

With reference to the attached drawings, a preferred embodiment of a communication terminal according to the present invention will be described in detail.

In this embodiment, the communication terminal according to the present invention is applied to a UART 10, one of internal interfaces that have the Bluetooth function. The parts not related directly to the present invention are omitted from the figures and the description. The reference numeral of a signal is represented by the reference numeral of a line on which the signal is sent.

Figure 1A:
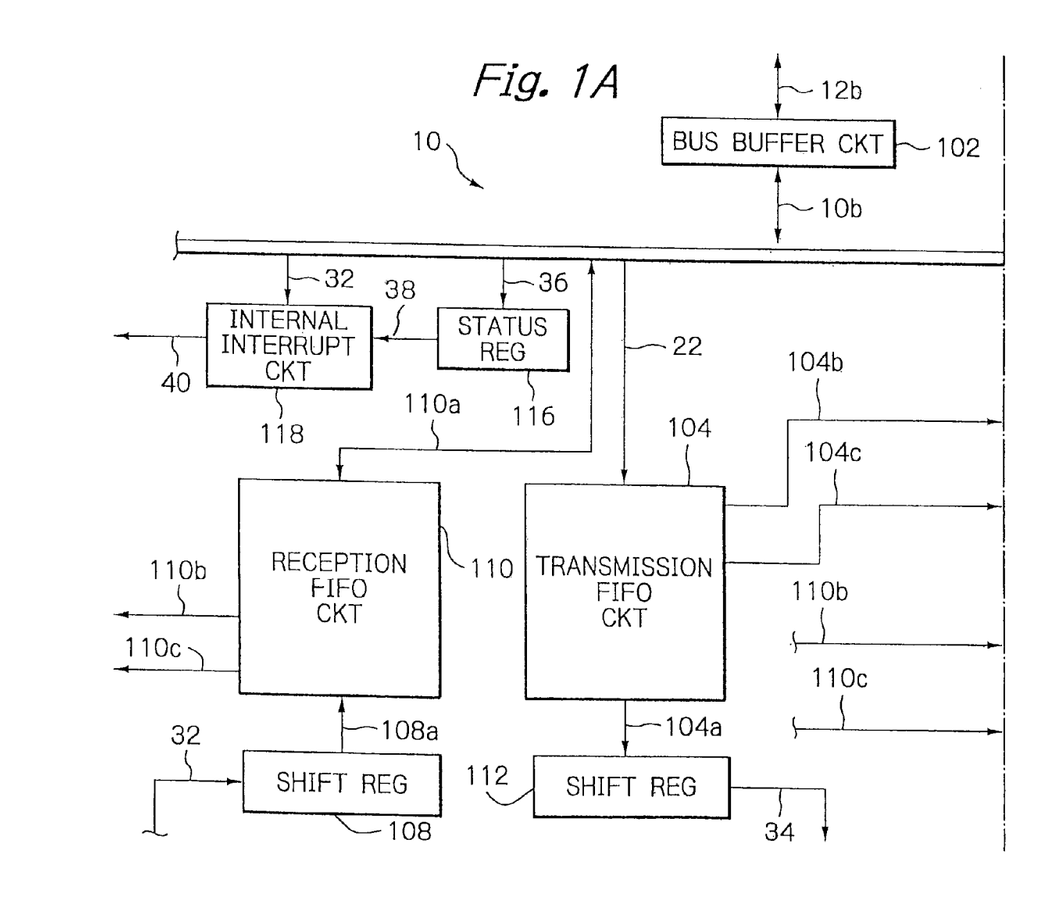
FIGS. 1A and 1B, when combined as shown in FIG. 1, are a schematic block diagram representative of an embodiment of a UART to which a communication terminal according to the present invention is applied.
Figure 1B:
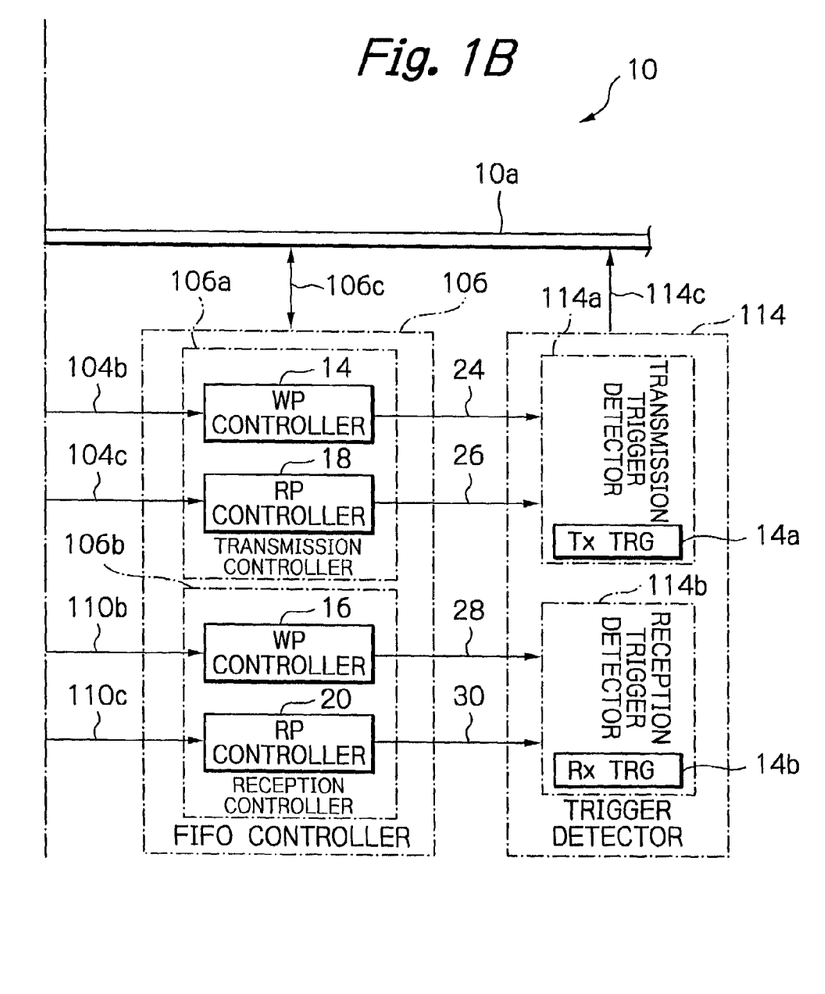
Figure 2:
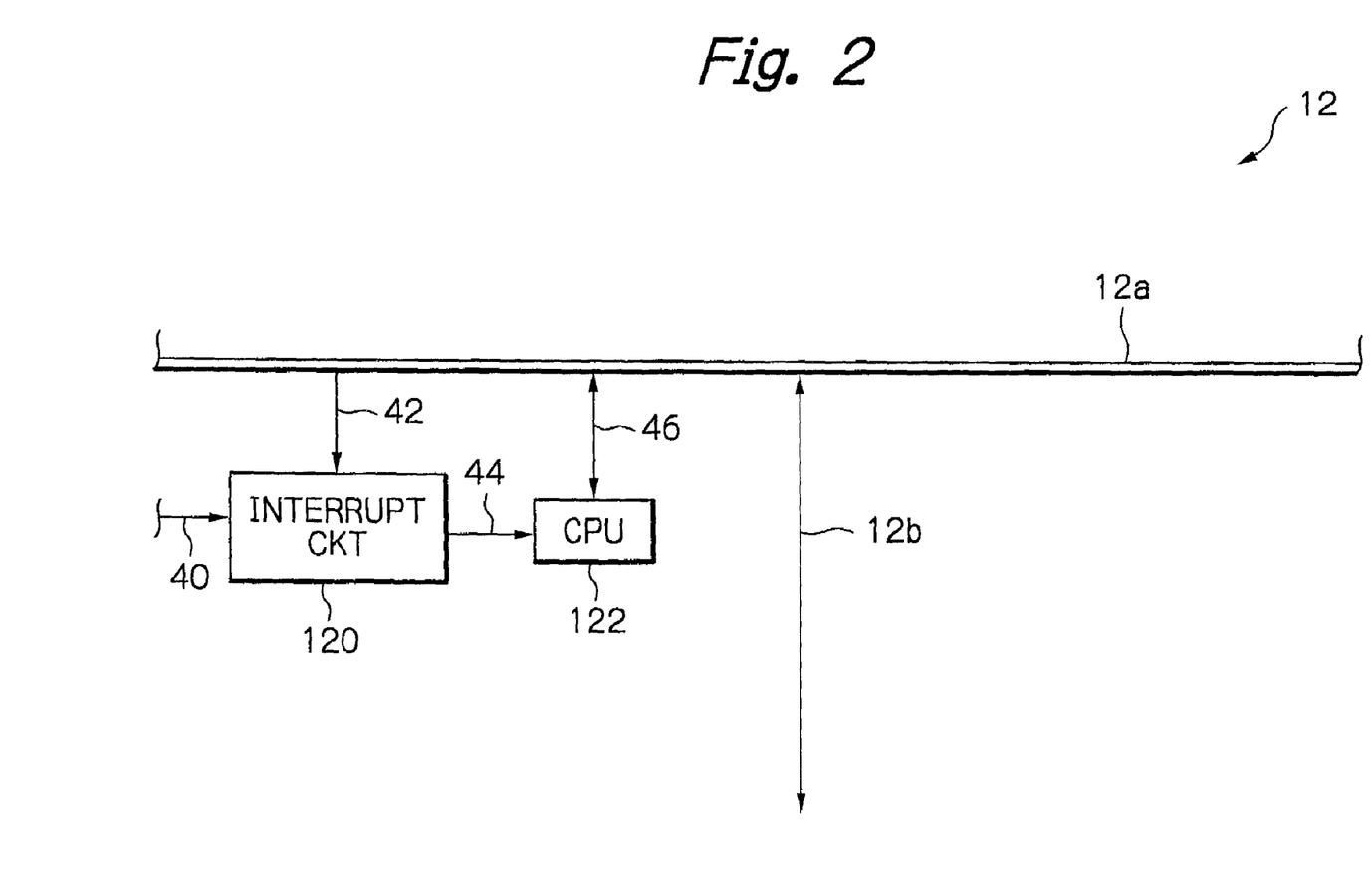
FIG. 2 is a schematic block diagram showing the configuration of a host that controls the UART shown in FIG. 1.

Although not apparently shown, the UART 10 shown in FIGS. 1A and 1B is installed in the Bluetooth module for a Bluetooth host 12, FIG. 2. The UART 10 comprises a bus buffer circuit 102, a transmission FIFO circuit 104, a FIFO controller 106, shift registers 108 and 112, a reception FIFO circuit 110, a trigger detector 114, a status register 116, and an internal interrupt circuit 118, FIGS. 1A and 1B. Although not shown in the figures, the Bluetooth module includes not only the UART but also a USB (Universal Serial Bus), a voice PCM (Pulse Code Modulation) module, an RF (Radio Frequency) module, a crystal oscillator, and a flash memory in the base band controller. In addition, the host 12 shown in FIG. 2 includes an interrupt circuit 120 and a CPU (Central Processing Unit) 122.

Returning to FIGS. 1A and 1B, the components of the UART 10 will be described. The bus buffer circuit 102 is provided in the UART 10. To transfer parallel data reliably between an internal data bus 10a of the UART 10 and a data bus 12a of the host 12 that is external to the UART 10, the bus buffer circuit 102 has a buffer memory, not specifically shown, which has a predetermined storage capacity, and in which input data is temporarily stored before output. The bus buffer circuit 102 is adapted to receive various types of data and control data from the CPU 122 of the host 12 and output them to the transmission FIFO circuit 104 and the FIFO controller 106 over internal data bus 10a, respectively.

In addition, the bus buffer circuit 102 is also adapted to receive external data through the shift register 108, reception FIFO circuit 110, and internal data bus 10a and send the received data to the host 12. The host 12 sends the received data to its components over the data bus 12a.

The transmission FIFO circuit 104 has a 16-byte FIFO memory in this embodiment. The transmission FIFO circuit 104 is adapted to receive data from the host 12, temporarily buffer the received data under the read/write control or parity data control of the FIFO controller 106, and output the data 104a that is read out, one byte at a time, to the shift register 112. The transmission FIFO circuit 104 outputs current write pointer (WP) data 104b and current read pointer (RP) data 104c to a transmission controller 106a.

The reception FIFO circuit 110 also has a 16-byte FIFO memory in this embodiment. The reception FIFO circuit 110 is also under the read/write control and parity data control of the FIFO controller 106. The reception FIFO circuit 110 is adapted to receive data 108a from the shift register 108, one byte at a time, for temporary buffering and output the received data 110a to the internal data bus 10a and then to the bus buffer circuit 102. The reception FIFO circuit 110 outputs current write pointer data 110b and current read pointer data 110c to a reception controller 106b.

Although the transmission FIFO circuit 104 and the reception FIFO circuit 110 each use a 16-byte FIFO memory in the above description, the FIFO memory is not limited to this size but they may use a 32-byte or 64-byte memory. However, it should be noted that a larger memory reduces the idle time of the CPU 122 caused by an interrupt but does not always increase processing efficiency of the CPU 122 because the CPU is used for processing the interrupt.

The FIFO controller 106 includes the transmission controller 106a and the reception controller 106b. The transmission controller 106a includes a write pointer controller 14 and a read pointer controller 18, and the reception controller 106b includes a write pointer controller 16 and a read pointer controller 20. The transmission FIFO circuit 104 sends the current write pointer data 104b and the current read pointer data 104c, respectively, to the write pointer controller 14 and the read pointer controller 18. Similarly, the reception FIFO circuit 110 sends the current write pointer data 110b and the current read pointer data 110c, respectively, to the write pointer controller 16 and the read pointer controller 20 of the reception controller 106b.

The write pointer controller 14 is adapted to send a pointer indication signal 106c, which indicates the next write pointer-pointing position, to the transmission FIFO circuit 104 over the internal data bus 10a and a signal line 22. The read pointer controller 18 is adapted to send the pointer indication signal 106c, which indicates the next read pointer-pointing position, to the transmission FIFO circuit 104 over the internal data bus 10a and the signal line 22. The write pointer controller 16 and the read pointer controller 20 of the reception controller 106b are also adapted to send the pointer indication signal 106c, which indicates the next pointer-pointing position, to the reception FIFO circuit 110 over the internal data bus 10a and the signal line 110a.

The write pointer controller 14 is adapted to output a write count signal 24 to a transmission trigger detector 114a of the trigger detector 114. The read pointer controller 18 is also adapted to output a read count signal 26 to the transmission trigger detector 114a. The reception controller 106b is also adapted to send a write count signal 28 and a read count signal 30 to a reception trigger detector 114b.

The FIFO controller 106 is not only adapted to control the write and read pointers to be sent to the transmission FIFO circuit 104 and the reception FIFO circuit 110, but also to check, upon receiving parity data, the state of the FIFO circuits 104 and 110 and, based on the result, controls interrupts. The FIFO controller 106 sends the status signal 106c, which depends on the interrupt control state, to the status register 116 over the internal data bus 10a.

The shift register 108 is adapted to convert serial data 32, which is received from an external unit, to parallel data 108a and output the converted data to the reception FIFO circuit 110. The shift register 112 is adapted to capture one-byte data 104a, which is received from the transmission FIFO circuit 104, converts the captured data to serial data 34, and send out the converted data to an external unit.

The trigger detector 114 is adapted to detect whether or not the remaining amount of data in the FIFO buffer has reached a predetermined amount. The trigger detector 114 includes the transmission trigger detector 114a and the reception trigger detector 114b. The transmission trigger detector 114a includes a counter, a transmission trigger register (hereinafter called TxTRG) 14a, a calculator, a comparator, and a trigger output circuit (not shown except TxTRG 14a).

The TxTRG 14a is an internal register. The counter is adapted to count the write count signal 24 and send this count value N to the comparator. The TxTRG 14a contains a numeric value n that determines an interrupt generation position and that indicates the predetermined remaining data amount. This numeric value is output to the calculator. With the FIFO circuit being F bytes in size (for example, 16 bytes), the calculator is adapted to calculate the amount of data to be transferred from the host 12 to the transmission FIFO circuit 104. The calculator uses the memory size F and the numeric value n stored in the TxTRG 14a to calculate (F−n). The first interrupt position, which affects the amount of supplied data, is 16−3−3 +1=11. The second and the following interrupts occur at positions 2×13−2=24, 3×13−2=37, and so on.

Therefore, the interrupt positions are represented as serial numbers such as 13×x11 where x=0, 1, 2, . . . ). The comparator compares one operand containing the numeric value (F−n) and the other operand containing the value N supplied from the counter. The value N indicates the position pointed to by the read pointer RP. If the numeric value (F−n) is equal to the counter value N, the comparator determines that the value of the write pointer has reached the transmission trigger position and outputs the trigger detection signal to the trigger output circuit. Otherwise, the comparator outputs no signal. The trigger output circuit, which functions as an output buffer, outputs the supplied trigger detection signal as an interrupt output control signal 114c. The interrupt output control signal 114c is sent to the internal interrupt circuit 118 over the internal data bus 10a and the signal line 32.

The reception trigger detector 114b also has a reception trigger register (RxTRG) 14b. Although detailed description is omitted, the reception trigger detector 114b detects a trigger based on the received write count signal 28 and the read count signal 30 and outputs the trigger detection signal to the internal interrupt circuit 118 as the interrupt output control signal 114c.

In response to a status signal 36, the status register 116 outputs an interrupt output control signal 38 to the internal interrupt circuit 118. In response to the interrupt output control signals 114c and 38, the internal interrupt circuit 118 outputs an internal interrupt signal 40 to the host 12.

Although separate from the FIFO controller 106 in the above description, the trigger detector 114 is preferably included in the FIFO controller 106.

The interrupt circuit 120 shown in FIG. 2 receives the internal interrupt signal 40 sent from the UART 10 and an interrupt request signal 42 generated by the host 12. The interrupt circuit 120 outputs an interrupt signal 44 to the CPU 122. In response to the received interrupt signal 44, the CPU 122 sends a control signal 46 to the components over the data bus 12a. The CPU 122, when interrupted by the internal interrupt signal 40, transfers data to the bus buffer circuit 102 in FIG. 1 over a signal line 12b. This data is then sent from the bus buffer circuit 102 to the transmission FIFO circuit 104 over a signal line 10b, internal data bus 10a, and signal line 22. The amount of transferred data is (F−n) bytes. The numeric value, n, is set in advance in the CPU 122 as data that is used to determine the interrupt position.

Transferring (F−n) bytes of data in this way fills the buffer without overwriting data stored in the transmission FIFO circuit 104.

Figure 3:
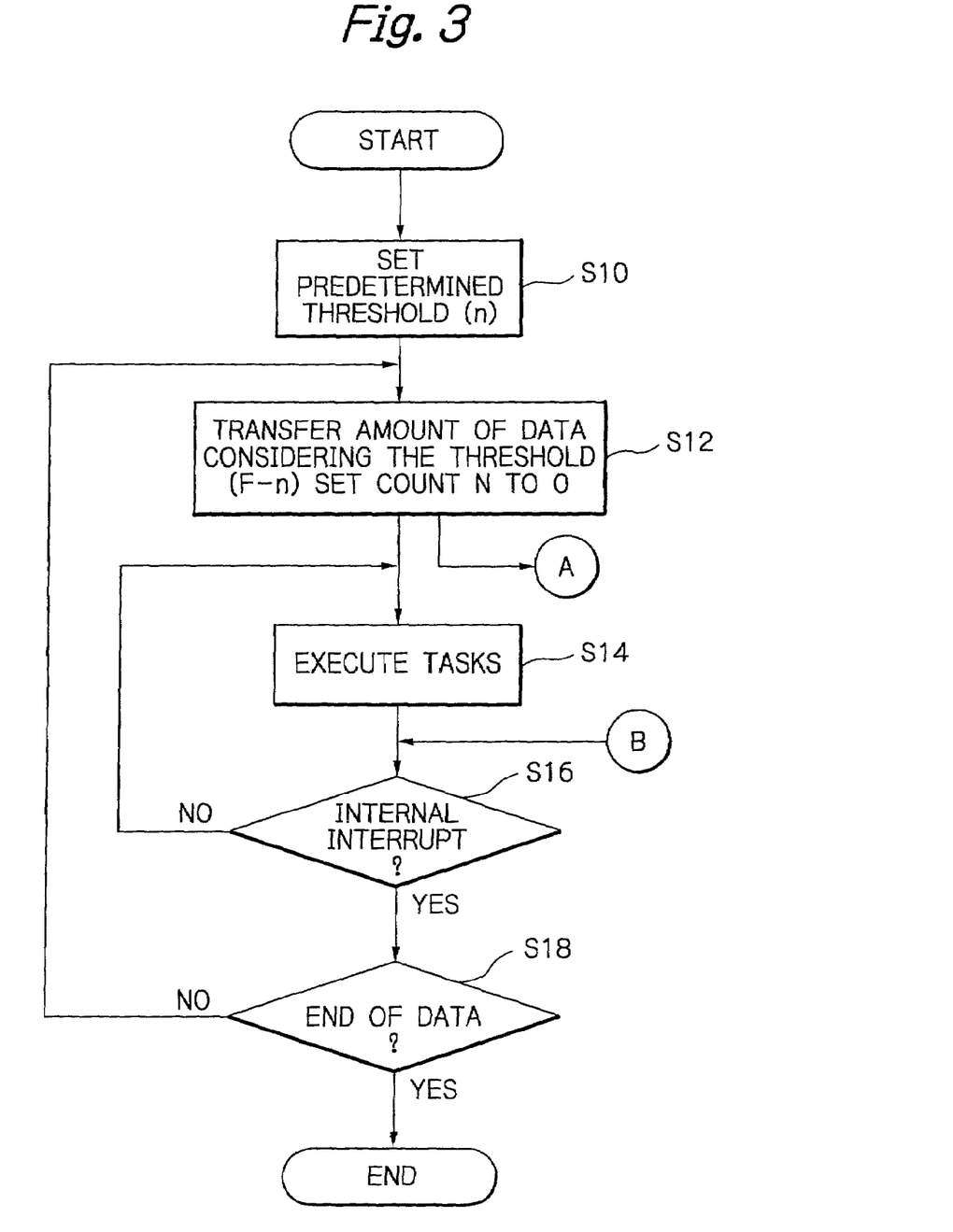
FIG. 3 is a flowchart useful for understanding the processing procedure of the CPU shown in FIG. 2.
Figure 4:
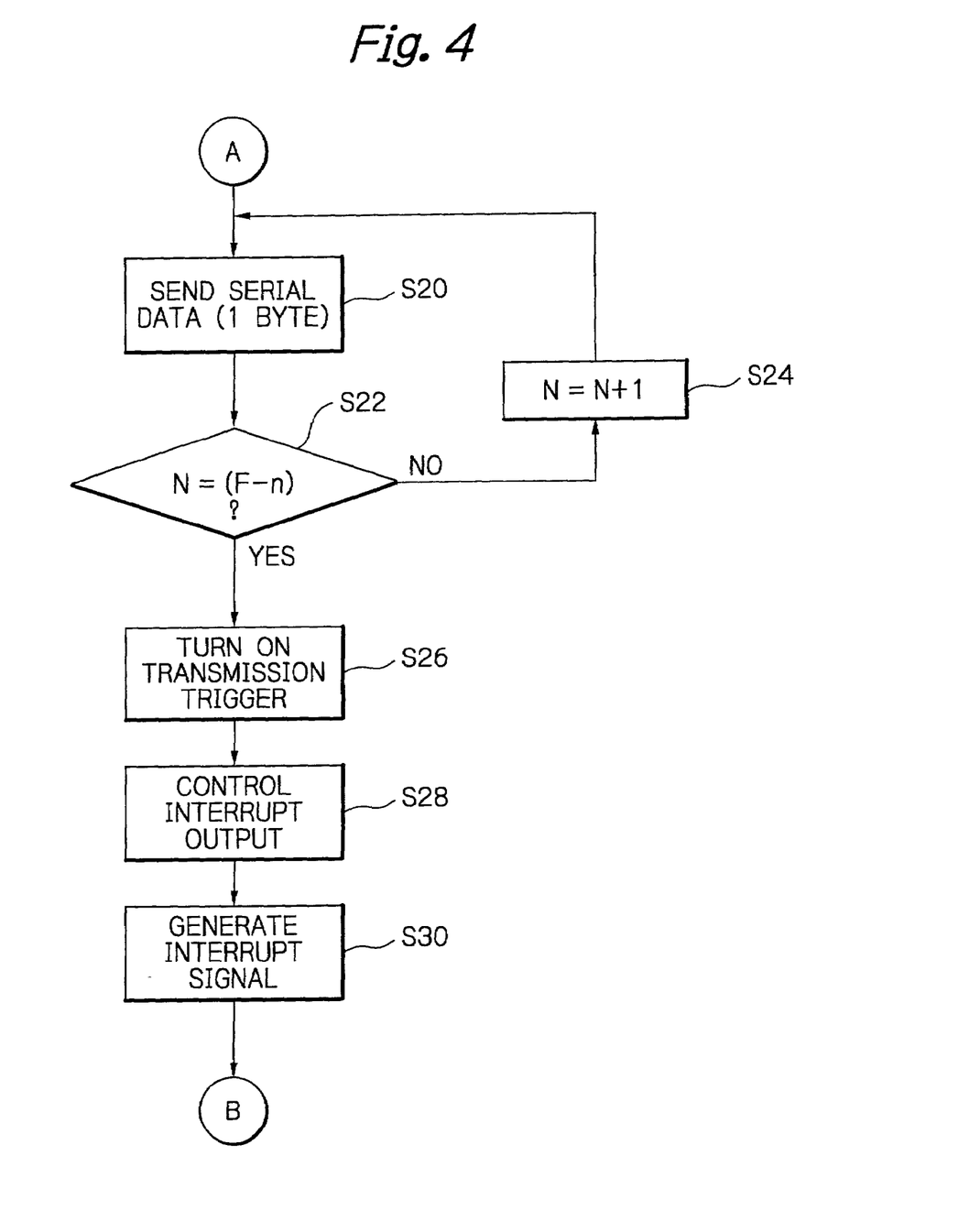
FIG. 4 is a flowchart useful for understanding the processing procedure of the UART that performs processing concurrently with the processing of the CPU shown in FIG. 3.

Next, the procedure for sending data from the host 12 to the UART 10 will be described. The flowchart in FIG. 3 shows the operation procedure executed by the CPU 122, and the flowchart in FIG. 4 shows the transmission processing executed by the UART 10. As will be described later, the CPU 122 and the UART 10 perform processing concurrently.

In the flowchart shown in FIG. 3, the CPU 122 in FIG. 2 first sets a numeric value n in the RAM (Random Access Memory; not shown) of the CPU 122. This numeric value n is indicative of the predetermined remaining data amount that determines the interrupt position in the transmission FIFO circuit 104. The CPU 122 also sets the numeric value n in the TxTRG 14a of the transmission trigger detector 114a in FIG. 1B (step S10). The CPU 122 sends data to the transmission FIFO circuit 104 considering the amount of data that may be transferred. The transfer data amount is the amount of data considering the predetermined remaining data amount (step S12).

When a 16-byte FIFO memory is installed (F=16), the transfer data amount is (16−n). The same calculation is executed also in the transmission trigger detector 114a. Note that, if the calculation result of the CPU 122 is sent to the TxTRG 14a of the transmission trigger detector 114a, the transmission trigger detector 114a would not need to have the calculator. At this time, the count value N in the CPU 122 and the transmission trigger detector 114a is initialized to zero (N=0). After setting these values, the CPU 122 executes task processing (step S14). Or, control is passed to the UART 10 via connector A.

Next, the interrupt circuit 120 of the host 12 checks if there is an internal interrupt in the UART (step S16). If there is no interrupt in the CPU 122 (NO), the CPU 122 continues task processing. If an internal interrupt occurs (YES), the interrupt circuit 120 sends the interrupt signal 44 to the CPU 122.

Then, the CPU 122 checks if there is transfer data (step S18). If there is transfer data, the CPU 122 returns control to step S12 to repeat the processing described above. If there is no transfer data (YES), the CPU 122 terminates data transfer and transmission.

On the other hand, the UART 10, which performs serial data transfer concurrently with the tasks executed by the CPU 122, reads out one byte of data from the transmission FIFO circuit 104 and sends the data 104a to the shift register 112 for conversion to serial data, as shown in FIG. 4. Then, the shift register 112 outputs the serial data 34 to an external unit (step S20).

The comparator, not shown, of the transmission trigger detector 114a compares the count value N with the value of (F−n) (that is, 16−n) (step S22). If they are not equal (NO) as the result of comparison, control is passed to step S24 determining that the count value N has not yet reached the interrupt position. In step S24, the count value N is incremented by +1 and control is transferred back to the serial data transmission step (step S20).

On the other hand, if they are equal (YES) as the result of comparison, the transmission trigger signal is turned on determining that the count value N has reached the interrupt position (step S26). When the transmission trigger signal is turned on, the transmission trigger detector 114a outputs the interrupt output control signal 114c through the output buffer, not shown (step S28). The transmission trigger signal may be output as the interrupt output control signal 114c.

The interrupt output control signal 114c sent over the internal data bus 10a is sent to the internal interrupt circuit 118, and the internal interrupt signal 40 generated by this circuit 118 is output to the interrupt circuit 120 of the host 12 (step S30). After this processing, control is passed to step S16 of FIG. 3 via connector B. Depending upon whether or not the internal interrupt signal 40 is present, the interrupt circuit 120 outputs the interrupt signal 44 to the CPU 122. If there is an internal interrupt, a check is made as to if there is transfer data and then interrupt processing is performed.

This operation procedure, that is, how data is sent to an external unit, will be described in detail with particular emphasis on the read/write operation of the transmission FIFO circuit 104. The 16-byte (F=16) FIFO memory is provided in the transmission FIFO circuit 104. The data amount n, which is the predetermined amount of data in the FIFO memory that will cause an interrupt, is set in the CPU 122 and the transmission trigger detector 114a. In this example, the data amount n=3 is set. For convenience, the numbers in the transmission FIFO circuit 104 indicate the data sequence. The arrows indicate the write pointer and the read pointer, abbreviated respectively to WP and RP.

Figure 5:
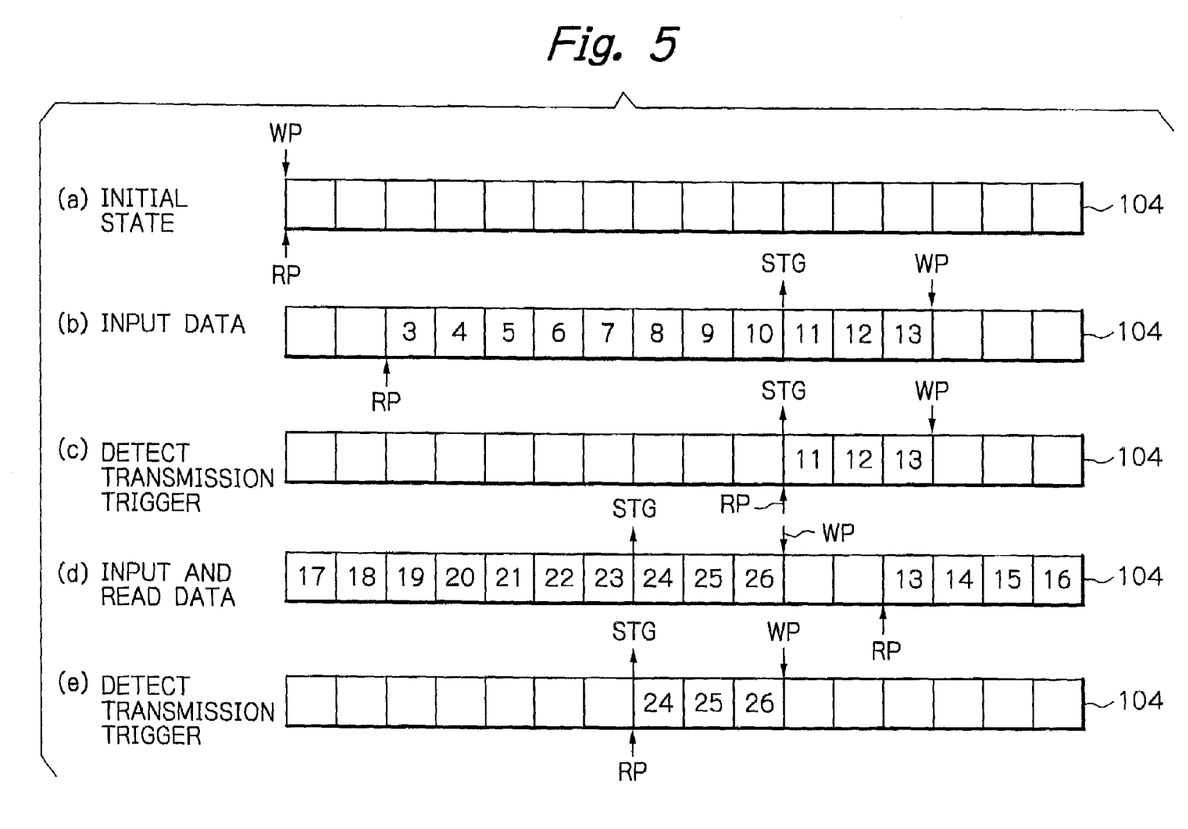
FIG. 5 shows the relation between pointers and an interrupt point during the operation of the transmission FIFO circuit shown in FIG. 1.

Initially, the transmission FIFO circuit 104 in FIG. 5, part (a) contains no data. The WP and the RP point to the same position. Next, 13 (=16−3) units of data are sent from the host 12 to the transmission FIFO circuit 104. As this data is written, the WP is incremented to point to position 14. The data read operation starts at the same time data is written. In the transmission FIFO circuit 104 shown in FIG. 5, part (b), the RP points to position 3 (RP=3). The position that precedes by three positions the position designated by the current write position (WP=14) is the transmission trigger generation position STG (Send TriGger) (14−3=11). The position that precedes by three positions the position designated by the pointer corresponds to the predetermined remaining number of bytes n=3. The value N in the counter corresponds to a position relative to the position pointed to by the read pointer.

In FIG. 5, part (c), the read pointer RP of the transmission FIFO circuit 104 points to the trigger generation position, and the transmission trigger detector 114a detects the trigger generation position STG at N=11. After this position is reached, the trigger generation position is shifted by 13. When the transmission trigger detector 114a detects a trigger condition, the internal interrupt circuit 118 sends the internal interrupt signal 40 to the interrupt circuit 120. The interrupt circuit 120 then sends the interrupt signal 44 to the CPU 122.

The CPU 122 checks if there is still transfer data. If there is transfer data, the CPU 122 transfers 13 units of data starting from the position pointed to by the write pointer WP. The transmission FIFO circuit 104 keeps on reading data even during the transfer with the result that the read pointer now points to position 13 as shown in FIG. 5, part (d). After data has been transferred, the trigger generation position STG in the transmission FIFO circuit 104 precedes by the position three positions the position designated by the write pointer WP (STG=24).

FIG. 5, part (e) shows the transmission FIFO circuit 104 when the read pointer, which has been incremented by 13 from the position shown in FIG. 5, part (c), points to the position that is the trigger generation position STG.

Even when data has been transmitted from the transmission FIFO circuit 104, the FIFO controller 106 assigns priority to the operation of the trigger detector 114 that indicates that data is being transmitted and inhibits the internal interrupt signal 40 from being sent to the internal interrupt circuit 118. This inhibition enables the interrupt output control signal 114c that is output from the transmission trigger detector 114a of the trigger detector 114. This control is effective during processing.

Figure 6:
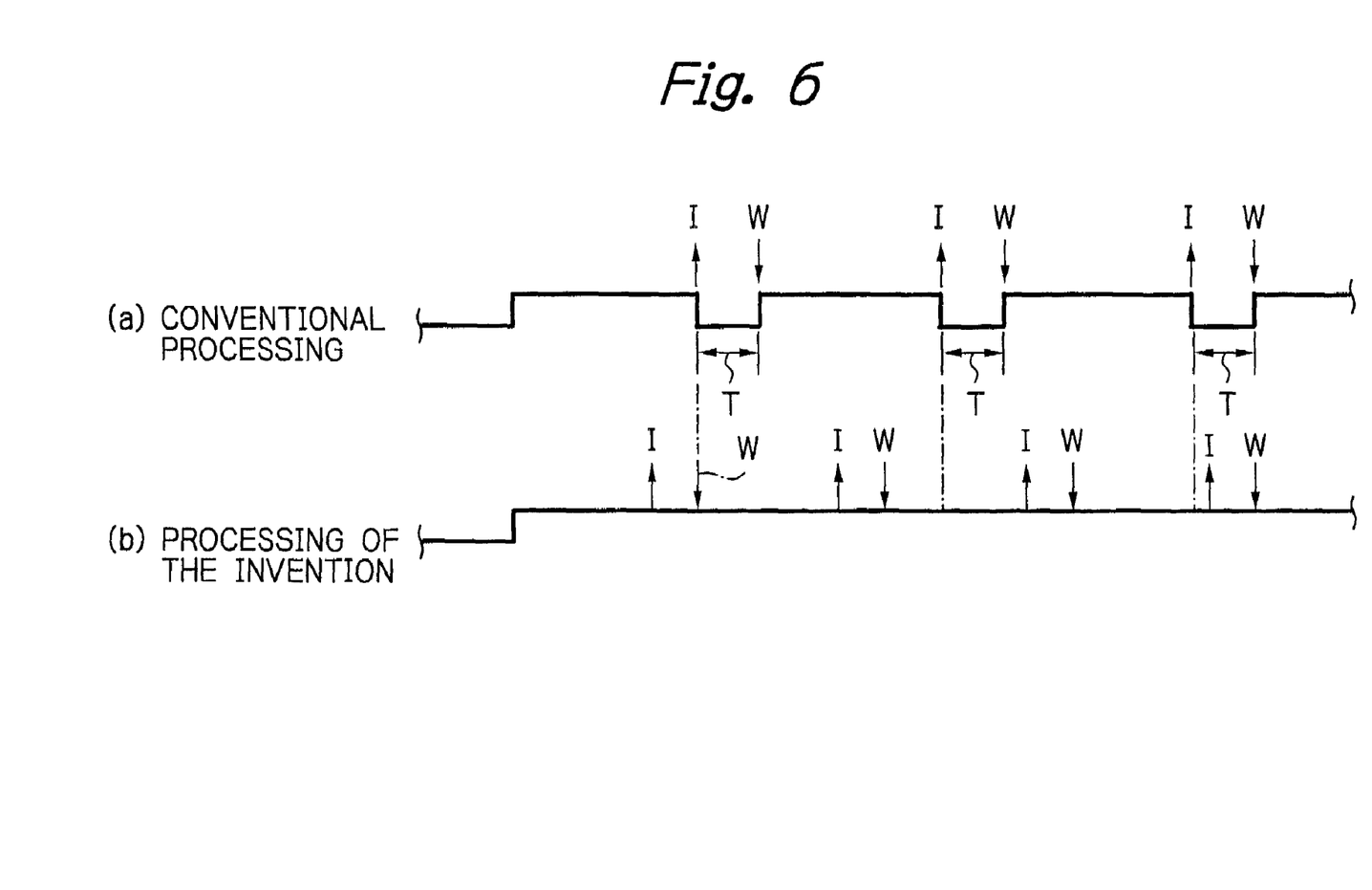
FIG. 6 shows the positional relation between interrupts and write operations in the conventional method and the method according to the present invention.

When data is transferred between the host 12 and the UART 10 repeatedly in the conventional data transmission method, there is a wait time (T), as shown in FIG. 6, line (a), between the time (I) an interrupt occurs and the time (W) data is written. In the UART 10 to which the present invention is applied, the predetermined remaining number of bytes n, which indicates the interrupt position, is set in advance before completing data transmission. The UART 10 detects a trigger indicating that the value of the read pointer RP or the count value N has reached the position corresponding to this setting and, upon detecting the trigger, outputs the interrupt output control signal 114c to cause an internal processing.

The internal interrupt signal 40 is generated in response to the trigger. When all data has not yet been transmitted from the transmission FIFO circuit 104, the CPU 122 of the host 12 controls the amount of data to be transferred to the transmission FIFO circuit 104 to prevent data in that circuit from being overwritten. Therefore, with the numeric value n ideally set up, this configuration allows data to be written into, and read out from, the transmission FIFO circuit 104 without wait time.

However, it is possible that the processing efficiency of the CPU 122, which must perform interrupt processing frequently while executing other task processing, may be degraded. There is a tradeoff for the CPU 122 between interrupt processing and processing efficiency. Preferably, the predetermined remaining number of bytes n should be decided with this tradeoff in mind. At present, the UART 10 uses a 64-byte or larger FIFO memory. In such a case, a larger number may be used for the predetermined remaining number of bytes of the UART according to the present invention. For example, a numeric value ranging from 8 to 16 may be used.

In addition, speeding the CPU 122 leads to the reduction in the interrupt processing time but complicates the system used by the CPU 122 and therefore increases the processing time of the CPU 122. An example is an application program running under RTOS (Real-Time Operating System) such as ITRON (Industrial The Real-time Operating system Nucleus) used by the Bluetooth. In such a case, the numeric value n should be experimentally decided.

Although the UART 10 in this embodiment is described primarily based on the hardware configuration, it is also possible to transfer data from the host 12 to the UART 10 on a software basis based on the amount of transmitted data and an interrupt position that is set up (software UART).

A communication terminal with the configuration described above sets up the interrupt position in the transmission FIFO circuit before data transmission is completed, checks if a trigger indicating that the value in the read pointer RP or the counter value has reached the interrupt position that has been set up, and outputs the interrupt output control signal to perform internal interrupt processing. The internal interrupt signal is output when the trigger condition is detected. When all data has not yet been transmitted from the transmission FIFO circuit 104, the CPU 122 of the host controls the amount of data to be transferred to the transmission FIFO circuit 104 to prevent data in that circuit from being overwritten and to avoid a delay caused by CPU interrupt processing. This method minimizes the waste involved in interrupt processing and allows the user to perform communication more efficiently than in the conventional communication method. This method is especially useful where high-speed data communication is required. For example, the method relatively reduces an interrupt processing delay generated during high-speed data communication such as radio communication using the Bluetooth technology.

The entire disclosure of Japanese patent application No. 2001-207515 filed on Jul. 9, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication terminal comprising:
   a first data bus;
   a second data bus;
   a bus buffer circuit connected to said first and second data buses and having a memory for temporarily storing input data;
   a shift register connected to an external unit;
   a FIFO controller connected to said second data bus and comprising a transmission controller and a reception controller,
   said transmission controller comprising a first write pointer controller which outputs a first write count signal and a first read pointer controller which outputs a first read count signal,
   said reception controller comprising a second write pointer controller which outputs a second write count signal and a second read pointer controller which outputs a second read count signal;
   a trigger detector connected to said second data bus and comprising a transmission trigger detector and a reception trigger detector,
   said transmission trigger detector counting an input of the first read count signal to generate a first count value, and outputting a first interrupt output control signal when the first count value is equal to a first predetermined value indicating a remaining data amount,
   said reception trigger detector counting an input of the second read count signal to generate a second count value, and outputting a second interrupt output control signal when the second count value is equal to a second predetermined value indicating a remaining data amount;
   a transmission FIFO circuit connected to said second data bus for storing first data input from said bus buffer circuit according to a first write pointer designating an address where the first data are to be written into, said transmission FIFO circuit reading out the stored first data according to a first read pointer designating an address where the first data are stored;
   a reception FIFO circuit connected to said second data bus and said shift register for storing second data input from said shift register according to a second write pointer designating an address where the second data are to be written into, said reception FIFO circuit reading out the stored second data according to a second read pointer designating an address where the second data are stored;
   an internal interrupt circuit connected to said second data bus for outputting a first internal interrupt signal, when the first interrupt output control signal is input thereto;
   an interrupt circuit connected to said first data bus for generating a first interrupt signal in response to the first internal interrupt signal; and
   a central processor letting the data stored in said bus buffer circuit be written into said transmission FIFO circuit, when the first interrupt signal is input thereto.

2. The communication terminal in accordance with claim 1, wherein said internal interrupt circuit outputs a second internal interrupt signal, when the second interrupt output control signal is input thereto,
   said interrupt circuit generating a second interrupt signal in response to the second internal interrupt signal, and
   said central processor letting the data stored in said shift register be written into said reception FIFO circuit, when the second interrupt signal is input thereto.

* * * * *